(12) United States Patent
Damghanian et al.

(10) Patent No.: US 12,225,210 B2
(45) Date of Patent: Feb. 11, 2025

(54) SEGMENT POSITION SIGNALLING WITH SUBPICTURE SLICE POSITION DERIVING

(71) Applicant: Telefonaktiebolaget LM Ericsson (publ), Stockholm (SE)

(72) Inventors: Mitra Damghanian, Upplands-Bro (SE); Martin Pettersson, Vallentuna (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 270 days.

(21) Appl. No.: 17/762,295

(22) PCT Filed: Jun. 26, 2020

(86) PCT No.: PCT/SE2020/050668
§ 371 (c)(1),
(2) Date: Mar. 21, 2022

(87) PCT Pub. No.: WO2021/061033
PCT Pub. Date: Apr. 1, 2021

(65) Prior Publication Data
US 2022/0385924 A1    Dec. 1, 2022

Related U.S. Application Data

(60) Provisional application No. 62/904,286, filed on Sep. 23, 2019.

(51) Int. Cl.
*H04N 19/174*    (2014.01)
*H04N 19/169*    (2014.01)
(Continued)

(52) U.S. Cl.
CPC ....... *H04N 19/174* (2014.11); *H04N 19/1887* (2014.11); *H04N 19/30* (2014.11); *H04N 19/44* (2014.11)

(58) Field of Classification Search
CPC .. H04N 19/119; H04N 19/167; H04N 19/174; H04N 19/1887; H04N 19/30; H04N 19/70; H04N 19/44
See application file for complete search history.

(56) References Cited

U.S. PATENT DOCUMENTS

| 11,425,399 B2 | 8/2022 | Lee et al. |
| 2015/0016503 A1 | 1/2015 | Rapaka et al. |

(Continued)

FOREIGN PATENT DOCUMENTS

| GB | 2572770 A | 10/2019 |
| GB | 2581852 A | 9/2020 |

(Continued)

OTHER PUBLICATIONS

International Search Report and Written Opinion issued in International Application No. PCT/SE2020/050668, dated Feb. 2, 2020 (14 pages).

(Continued)

*Primary Examiner* — Mainul Hasan
(74) *Attorney, Agent, or Firm* — Rothwell, Figg, Ernst & Manbeck, P.C.

(57) ABSTRACT

There are provided mechanisms for performed by a decoder. The method comprises receiving a coded video stream (CVS). The method comprises processing the CVS, wherein: the CVS comprises a first set of one or more codewords that encodes a first set of one or more values representing a first part of a segment address, the CVS comprises a second set of one or more codewords that encodes a second set of one or more values representing a second part of the segment address, and the segment address specifies the spatial location of a segment within a picture.

20 Claims, 9 Drawing Sheets

(51) Int. Cl.
*H04N 19/30* (2014.01)
*H04N 19/44* (2014.01)

(56) References Cited

U.S. PATENT DOCUMENTS

| | | | |
|---|---|---|---|
| 2019/0082178 A1 | 3/2019 | Kim et al. | |
| 2020/0351497 A1* | 11/2020 | Skupin | H04N 19/46 |
| 2021/0218965 A1* | 7/2021 | Li | H04N 19/70 |
| 2021/0409730 A1* | 12/2021 | Wang | H04N 19/174 |
| 2022/0007035 A1* | 1/2022 | Lee | H04N 19/70 |
| 2022/0239949 A1* | 7/2022 | Hannuksela | H04N 19/1883 |

FOREIGN PATENT DOCUMENTS

| | | | | |
|---|---|---|---|---|
| JP | 2022-548220 A | 11/2022 | | |
| WO | 2017/196727 A1 | 11/2017 | | |
| WO | 2019/002662 A1 | 1/2019 | | |
| WO | 2019/145262 A1 | 8/2019 | | |
| WO | 2020/008103 A1 | 1/2020 | | |
| WO | 2020/053477 A2 | 3/2020 | | |
| WO | 2020/127110 A1 | 6/2020 | | |
| WO | 2020/130910 A1 | 6/2020 | | |
| WO | WO-2020146582 A1 * | 7/2020 | | H04N 19/119 |
| WO | 2020/185145 A1 | 9/2020 | | |
| WO | WO-2020176636 A1 * | 9/2020 | | H04N 19/105 |
| WO | WO-2020185883 A1 * | 9/2020 | | G06V 10/62 |

OTHER PUBLICATIONS

IPRP issued in International Application No. PCT/SE2020/050668, dated Nov. 17, 2021 (15 pages).

Sjöberg, R., et al., "AHG12: On slice address signaling", Joint Video Experts Team (JVET) of ITU-T SG 16 WP 3 and ISO/IEC JTC 1/SC 29/WG 11, 16th Meeting: Geneva, CH, Oct. 2019, Document: JVET-P0609-v2 (6 pages).

Pettersson, M., et al., "AHG12: Multiple tile partitions in PPS", Joint Video Experts Team (JVET) of ITU-T SG 16 WP 3 and ISO/IEC JTC 1/SC 29/WG 11, 16th Meeting: Geneva, CH, Oct. 2019, Document: JVET-P0364 (6 pages).

Sabir, M., et al., "Joint Source-Channel Distortion Modeling for MPEG-4 Video", IEEE Transactions on Image Processing, vol. 18, No. 1, Jan. 2009 (pp. 90-105).

Sjöberg, R., et al., "Flexible Tiles", Joint Video Experts Team (JVET) of ITU-T SG 16 WP 3 and ISO/IEC JTC 1/SC 29/WG 11, 161h Meeting: Ljubljana, SI, Jul. 2018, Document: JVET-K0260-v1 (7 pages).

Benjamin Bross et al., Versatile Video Coding (Draft 6), Joint Video Experts Team (JVET) of ITU-T SG 16 WP 3 and ISO/IEC JTC 1/SC 29/WG 11, 151h Meeting: Gothenburg, SE, Document: JVET-O2001-vE (455 pages).

Wang, Y., "Core Experiment Description of Sub-Picture Coding", ITU—Telecommunications Standardization Sector, Study Group 16 Question 6, Video Coding Experts Group (VCEG), XP-001089807, Document VCEG-O57, 15th Meeting: Pattaya, Thailand, Dec. 3-7, 2001 (10 pages).

Boyce, J. et al., "Sub-pictures and sub-pictures sets with level derivation", Joint Video Experts Team (JVET) of ITU-T SG 16 WP 3 and ISO/IEC JTC 1/SC 29/WG 11, 15th Meeting, Document: JVET-O0555-v1, Gothenburg, SE Jul. 3-12, 2019 (11 pages).

Hannuksela, M. et al., "AHG12: Comparison of approaches for independently coded picture regions", Joint Video Experts Team (JVET) of ITU-T SG 16 WP 3 and ISO/IEC JTC 1/SC 29/WG 11, 14th Meeting, Document: JVET-N0044, Geneva, CH Mar. 19-27, 2019 (12 pages).

* cited by examiner

Tiles

Tiles and bricks

SEGMENT POSITION SIGNALLING WITH SUBPICTURE SLICE POSITION DERIVING

CROSS REFERENCE TO RELATED APPLICATIONS

This application is a 35 U.S.C. § 371 National Stage of International Patent Application No. PCT/SE2020/050668, filed Jun. 26, 2020, which claims priority to U.S. provisional application No. 62/904,286, filed on Sep. 23, 2019. The above identified applications are incorporated by reference.

TECHNICAL FIELD

This disclosure relates to video coding and decoding.

BACKGROUND

1. HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). At the time of writing, the current version of the VVC draft specification was "Versatile Video Coding (Draft 6)", JVET-O2001-vE. When VVC is referred in this document it refers to the Draft 6 of the VVC specification.

2. Components

A video sequence consists of a series of pictures where each picture consists of one or more components. Each component can be described as a two-dimensional rectangular array of sample values. It is common that a picture in a video sequence consists of three components: one luma component (Y) where the sample values are luma values, and two chroma components (Cb) and (Cr), where the sample values are chroma values. It is common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components. In this document, we describe methods useful for the encoding and decoding of video sequences. However, it should be understood that the techniques described can also be used for encoding and decoding of still images.

3. Blocks and Units

A block is a two-dimensional array of samples. In video coding, each component is split into one or more blocks and the coded video bitstream is a series of blocks.

It is common in video coding that the picture is split into units that cover a specific area. Each unit consists of all blocks that make up that specific area and each block belongs fully to only one unit. The coding unit (CU) in HEVC and VVC is an example of such a unit. A coding tree unit (CTU) is a logical unit which can be split into several CUs.

In HEVC, CUs are squares, i.e., they have a size of N×N luma samples, where N can have a value of 64, 32, 16 or 8. In the current H.266 test model Versatile Video Coding (VVC), CUs can also be rectangular, i.e. have a size of N×M luma samples where N is different to M.

4. NAL Units

Both HEVC and VVC define a Network Abstraction Layer (NAL). All the data, i.e. both Video Coding Layer (VCL) or non-VCL data in HEVC and VVC is encapsulated in a NAL unit. A VCL NAL unit contains data that represents picture sample values. A non-VCL NAL unit contains additional associated data such as parameter sets and supplemental enhancement information (SEI) messages. The NAL unit in HEVC and the current version of VVC begins with a header called the NAL unit header. The syntax for the NAL unit header for HEVC is shown in table 1 and starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as an HEVC bitstream. The nal_unit_type, nuh_layer_id and nuh_temporal_id_plus1 code words specify the NAL unit type of the NAL unit which identifies what type of data is carried in the NAL unit, the layer ID, and the temporal ID for which the NAL unit belongs to, respectively. The NAL unit type indicates and specifies how the NAL unit should be parsed and decoded. The NAL unit header in the current version of VVC is very similar to the one in HEVC, but uses 1 bit less for the nal_unit_type and instead reserves this bit for future use.

The rest of the bytes of the NAL unit is payload of the type indicated by the NAL unit type. A bitstream consists of a series of concatenated NAL units.

TABLE 1

| HEVC NAL unit header syntax | |
|---|---|
| | Descriptor |
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

TABLE 1

| NAL unit header syntax of the current version of VVC | |
|---|---|
| | Descriptor |
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft are shown in table 3.

The decoding order is the order in which NAL units shall be decoded, which is the same as the order of the NAL units within the bitstream. The decoding order may be different from the output order, which is the order in which decoded pictures are to be output, such as for display, by the decoder.

A coded video sequence (CVS) in HEVC is a series of access units starting at an IRAP access unit up to, but not including the next TRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be

TABLE 3

NAL unit types in the current version of the VVC draft

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4 . . . 7 | RSV_VCL_4 . . . RSV_VCL_7 | Reserved non-IRAP VCL NAL unit types | VCL |
| 8 | IDR_W_RADL | Coded slice of an IDR picture | VCL |
| 9 | IDR_N_LP | slice_layer_rbsp( ) | |
| 10 | CRA_NUT | Coded slice of a CRA picture silce_layer_rbsp( ) | VCL |
| 11 | GDR_NUT | Coded slice of a GDR picture slice_layer_rbsp( ) | VCL |
| 12 | RSV_IRAP_VCL12 | Reserved IRAP VCL NAL unit types | VCL |
| 13 | RSV_IRAP_VCL13 | | |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 . . . 27 | RSV_NVCL25 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

5. Intra Random Access Point (RAP) Pictures and the Coded Video Sequence (CVS)

An intra random access point (IRAP) picture in HEVC is a picture that does not refer to any pictures other than itself for prediction in its decoding process. The first picture in the bitstream in decoding order in HEVC must be an RAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture.

present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is started at a CVS start (CVSS) access unit, which may contain an IRAP picture, i.e, an IDR or a CRA picture, or a gradual decoding refresh (GDR) picture.

GDR pictures are essentially used for random access in bitstreams encoded for low-delay coding where a full IRAP picture would cause too much delay. A GDR picture may use gradual intra refresh that updates the video picture by picture where each picture is only partially intra coded. It is signaled with the GDR picture when the video is fully refreshed and ready for output, given that the bitstream was tuned into at the GDR picture. A GDR may start a CVS.

6. Parameter Sets

HEVC and VVC specify three types of parameter sets: the picture parameter set (PPS), the sequence parameter set (SPS), and the video parameter set (VPS). The PPS contains data that is common for one or more pictures, the SPS contains data that is common for a coded video sequence (CVS), and the VPS contains data that is common for multiple CVSs. In order to provide random-access points in a bitstream it is common to periodically encode pictures as IRAP or GDR pictures where each such picture is preceded by the parameter sets necessary for decoding (VPS, SPS, PPS).

The current version of VVC also specifies two additional parameter sets, the adaptation parameter set (APS) and the decoder parameter set (DPS).

The APS carries parameters needed for the adaptive loop filter (ALF) tool and the luma mapping and chroma scaling (LMCS) tool.

The DPS contains information that may not change during the decoding session and may be good for the decoder to know about, e.g. the maximum number of allowed sublayers. The information in the DPS is not necessary for operation of the decoding process.

7. Tiles and Bricks

The draft VVC video coding standard includes a tile tool that divides a picture into rectangular spatially independent regions, which may be called tiles. Tiles in the draft VVC coding standard are similar to the tiles used in HEVC, but with a two-step partitioning mechanism. Using the tile tool, a picture in HEVC can be partitioned into rows and columns of samples where a tile is an intersection of a row and a column. FIG. 9A shows an example of partitioning using 4 tile rows and 5 tile columns resulting in a total of 20 tiles for the picture.

The tile structure is signaled in the picture parameter set (PPS) by specifying the heights of the rows and the widths of the columns. Individual rows and columns can have different sizes, but the partitioning always spans across the entire picture, from left to right and top to bottom respectively.

There is no decoding dependency between tiles of the same picture. This includes intra prediction, context selection for entropy coding, and motion vector prediction. One exception is that in-loop filtering dependencies are generally allowed between tiles.

The two-step tile partitioning in VVC starts by partitioning the picture into tiles as in HEVC. Then each tile can be optionally partitioned into bricks by horizontal boundaries as shown to the right in FIG. 9B. In the current VVC specification draft, the word brick is used also for tiles that are not further partitioned which means that the picture to the right in FIG. 9B consist of 9 bricks.

8. Slices

The concept of slices in HEVC divides a picture into independently coded slices, where decoding of one slice in a picture is independent of other slices in the same picture. Different coding types could be used for slices of the same picture, i.e. a slice could either be an I-slice, P-slice or B-slice. One purpose of slices is to enable resynchronization in case of data loss.

In the current version of VVC, a slice consists of either a number of complete tiles or only a consecutive sequence of complete bricks of one tile. Each slice has i) a slice header comprising parameters that may be set for individual slices and ii) slice data. Some parameters are restricted to be the same for all slices in a picture. Each slice in a CVS is carried in a separate VCL NAL unit.

In a previous version of the VVC draft specification, slices were referred to as tile groups.

Two modes of slices are supported in the current version of the VVC, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

In the current version of the VVC draft specification, the slice_address given in the slice header (see Table 4) is used to derive the spatial position for a slice in a picture.

TABLE 4

| Slice address syntax in the slice header in the current version of the VVC specification draft | |
|---|---|
| | Descriptor |
| slice_header( ) {<br>  slice_pic_parameter_set_id<br>  if( rect_slice_flag || NumBricksInPic > 1 )<br>  slice_address<br>  ...<br>} | <br>ue(v)<br><br>u(v) |

Semantics:
slice_address specifies the slice address of the slice. When not present, the value of slice_address is inferred to be equal to 0.
If rect_slice_flag is equal to 0, the following applies:
  - The slice address is the brick ID as specified by Equation (7-59).
  - The length of slice_address is Ceil( Log2 ( NumBricksInPic ) ) bits.
  - The value of slice_address shall be in the range of 0 to NumBricksInPic − 1, inclusive.
Otherwise (rect_slice_flag is equal to 1), the following applies:
  - The slice address is the slice ID of the slice.
  - The length of slice_address is signalled_slice_id_length_minus1 + 1 bits.
  - If signalled_slice_id_flag is equal to 0, the value of slice_address shall be in the range of 0 to TABLE 4-continued Slice address syntax in the slice header in the current version of the VVC specification draft num_slices_in_pic_minus1, inclusive. Otherwise, the value of slice_address shall be in the range of 0 to $2^{(signalled\_slice\_id\_length\_minus1 + 1)} - 1$, inclusive It is a requirement of bitstream conformance that the following constraints apply:
- The value of slice_address shall not be equal to the value of slice_address of any other coded slice NAL unit of the same coded picture.
- When rect_slice_flag is equal to 0, the slices of a picture shall be in increasing order of their slice_address values.
- The shapes of the slices of a picture shall be such that each brick, when decoded, shall have its entire left boundary and entire top boundary consisting of a picture boundary or consisting of boundaries of previously decoded brick(s).

9. Subpictures

Subpictures are supported in the current version of VVC. Subpictures are defined as a rectangular region of one or more slices within a picture. This means a subpicture contains one or more slices that collectively cover a rectangular region of a picture. In the current version of VVC specification the subpicture location and size are signaled in the SPS. Boundaries of a subpicture region may be treated as picture boundaries (excluding in-loop filtering operations) conditioned to a per-subpicture flag subpic_treated_as_pic_flag[i] in the SPS. Also loop-filtering on subpicture boundaries is conditioned to a per-subpicture flag loop_filter_across_subpic_enabled_flag[i] in the SPS. Table 5 shows the subpicture syntax in the SPS in the current version of VVC.

TABLE 5

Subpicture syntax in the SPS in the current version of the VVC specification draft

| | Descriptor |
|---|---|
| seq_parameter_set_rbsp( ) { | |
| ... | |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
| ... | |
| } | |

Semantics:
subpics_present_flag equal to 1 indicates that subpicture parameters are present in the present in the SPS RBSP syntax. subpics_present_flag equal to 0 indicates that subpicture parameters are not present in the present in the SPS RBSP syntax.
  NOTE 2 - When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.
max_subpics_minus1 plus 1 specifies the maximum number of subpictures that may be present in the CVS. max_subpics_minus1 shall be in the range of 0 to 254. The value of 255 is reserved for future use by ITU-T | ISO/IEC.
subpic_grid_col_width_minus1 plus 1 specifies the width of each element of the subpicture identifier grid in units of 4 samples. The length of the syntax element is Ceil( Log2( pic_width_max_in_luma_samples / 4 ) ) bits.
The variable NumSubPicGridCols is derived as follows:
NumSubPicGridCols =
( pic_width_max_in_luma_samples + subpic_grid_col_width_minus1 * 4 + 3 ) /
( subpic_grid_col_width_minus1 * 4 + 4 )
subpic_grid_row_height_minus1 plus 1 specifies the height of each element of the subpicture identifier grid in units of 4 samples. The length of the syntax element is:
Ceil( Log2( pic_height_max_in_luma_samples / 4 ) ) bits.
The variable NumSubPicGridRows is derived as follows:
  NumSubPicGridRows =
    ( pic_height_max_in_luma_samples + subpic_grid_row_height_minus1 * 4 + 3 ) /
    ( subpic_grid_row_height_minus1 * 4 + 4 )
subpic_grid_idx[ i ][ j ] specifies the subpicture index of the grid position (i, j). The length of the syntax element is Ceil( Log2( max_subpics_minus1 + 1 )) bits.
The variables SubPicTop[ subpic_grid_idx[ i ][ j ] ], SubPicLeft[ subpic_grid_idx[ i ][ j ] ], SubPicWidth[ subpic_grid_idx [ i ][ j ] ], SubPicHeight[ subpic_grid_idx[ i ][ j ] ], and TABLE 5-continued Subpicture syntax in the SPS in the current version of the VVC specification draft

```
NumSubPics are derived as follows:
    NumSubPics = 0
    for( i = 0; i. < NumSubPicGridRows; i++ ) {
                            for( j = 0; j < NumSubPicGridCols; j++ ) {
                                if ( i = = 0)
                                    SubPicTop[ subpic_grid_idx[ i ][ j ] ] = 0
                                else if( subpic_grid_idx[ i ][ j ] != subpic_grid_idx[ i - 1 ][ j ] ) {
                                    SubPicTop[ subpic_grid_idx[ i ][ j ] ] = i
                                    SubPicHeight[ subpic_grid_idx[ i - 1][ j ] ] =
    i - SubPicTop[ subpic_grid_idx[ i - 1 ][ j ] ]
                                }
                                if (j = = 0)
                                    SubPicLeft[ subpic_grid_idx[ i ][ j ] ] = 0
                                else if (subpic_grid_idx[ i ][ j ] != subpic_grid_idx[ i ][ j - 1 ] ) {
                                    SubPicLeft[ subpic_grid_idx[ i ][ j ] ] = j
                                    SubPicWidth[ subpic_grid_idx[ i ][ j ] ] =
    j - SubPicLeft[ subpic_grid_idx[ i ][ j - 1 ] ]
                                }
                                if (i = = NumSubPicGridRows - 1)
                                    SubPicHeight[ subpic_grid_idx[ i ][ j ] ] =
    i - SubPicTop[ subpic_grid_idx[ i - 1 ][ j ] ] + 1
                                    if (j = = NumSubPicGridRows - 1)
                                    SubPicWidth[ subpic_grid_idx[ i ][ j ] ] =
    j - SubPicLeft[ subpic_grid_idx[ i ][ j - 1 ] ] + 1
                                    if( subpic_grid_idx[ i ][ j ] > NumSubPics)
                                    NumSubPics = subpic_grid_idx[ i ][ j ]
                            }
    }
```
subpic_treated_as_pic_flag[ i ] equal to 1 specifies that the i-th subpicture of each coded
picture in the CVS is treated as a picture in the decoding process excluding in-loop filtering
operations. subpic_treated_as_pic_flag[ i ] equal to 0 specifies that the i-th subpicture of
each coded picture in the CVS is not treated as a picture in the decoding process excluding
in-loop filtering operations. When not present, the value of subpic_treated_as_pic_flag[ i ]
is inferred to be equal to 0.
loop_filter_across_subpic_enabled_flag[ i ] equal to 1 specifies that in-loop filtering
operations may be performed across the boundaries of the i-th subpicture in each coded
picture in the CVS. loop_filter_across_subpic_enabled_flag[ i ] equal to 0 specifies that in-
loop filtering operations are not performed across the boundaries of the i-th subpicture in
each coded picture in the CVS. When not present, the value of
loop_filter_across_subpic_enabled_pic_flag[ i ] is inferred to be equal to 1.
It is a requirement of bitstream conformance that the following constraints apply:
    -               For any two subpictures subpic A and subpicB, when the index of subpicA is
        less than the index of subpicB, any coded NAL unit of subPicA shall succeed any
        coded NAL unit of subPicB in decoding order.
    -               The shapes of the subpictures shall be such that each subpicture, when
        decoded, shall have its entire left boundary and entire top boundary consisting of
        picture boundaries or consisting of boundaries of previously decoded subpictures.

SUMMARY

Certain challenges exist. For example, in the current version of the VVC draft specification, slice_address signaled in the slice header (see Table 4) is a u(v) coded codeword which is used to derive the spatial position of the slice in the picture. However, when subpicture partitioning is used, the spatial position of the slice in the subpicture cannot be derived directly from the slice_address codeword in the slice header, and it cannot be derived from the slice header that this slice belongs to a certain subpicture. In order to derive the spatial position of the slice in a subpicture in the current version of the VVC specification first the spatial position of the slice in the picture needs to be derived and second it needs to be derived that that spatial position in the picture belongs to a certain subpicture and then from that in a third step the spatial position of the slice in that subpicture can be derived. This multistep process for deriving the spatial position of a slice in a subpicture can be simplified which will facilitate the slice decoding process and positioning of the decoded pixel values in the subpicture.

Additionally, when subpictures are being extracted or merged (as in sub-bitstream extraction and merge), the spatial positions of slices in the subpictures do not change. This means that the positioning of the slice relative to the subpicture position is fixed in the sub-bitstream extraction and merge processes. This information is not currently exploited in the current version of the VVC specifications which indicates that the signaling for the slice addresses as in the current version of the VVC specifications is suboptimal and can be improved.

In the current version of the VVC specifications and in case of using subpicture partitioning, it cannot be derived from only the slice header which subpicture this slice is spatially located in. Although this relation is also fixed when subpictures are being extracted or merged, this information is not exploited in the current version of the VVC specification.

This disclosure aims to overcome the shortcomings of the current version of the VVC specification. In one embodiment, the shortcomings are overcome by including in the slice header information that indicates i) the subpicture that the slice belongs to and ii) the spatial positioning of the slice relative to the subpicture position that the slice belongs to. For example, in one variation the slice header includes two values for the slice address: i) one value for a subpicture ID which indicates the subpicture to which the slice belongs and ii) one value for a slice address which indicates the spatial positioning of the slice relative to the subpicture position to which the slice belongs. Using the two values of the slice address, the spatial position for a slice in a picture may then be derived by e.g. deriving the subpicture location in the picture from the subpicture ID (as one of the values signaled in the slice header), and then deriving the position of the slice in the subpicture from the other slice address value signaled in the slice header.

In the current version of the VVC specification, in the case where a bitstream is the result of a sub-bitstream extraction, the value of slice_address is mapped into the value of slice_id in the PPS to derive the spatial position of the slice. In this case, if the subset of the included slices in the sub-bitstream does not include the top-left corner slice of the pictures in the "original" bitstream, then the values of the slice IDs and the values of slice addresses will not be the same. Slice IDs provide an indirection mechanism to enable the sub-bitstream extraction and merge processes. In one embodiment, the subpicture ID may be used with an indirection mechanism instead of using an indirection mechanism for the slice address. This embodiment may be used for the case of sub_bitstream extraction and merge where the slice address relative to the subpicture stays the same during the process and the subpicture ID uses an indirection mechanism in, for example, SPS to map the initial subpicture IDs to the subpicture indexes in the new sub-bitstream.

Certain aspects of the present disclosure and their embodiments may provide solutions to the aforementioned challenges.

A first aspect of the embodiments defines a method performed by a decoder. The method comprises receiving a coded video stream (CVS). The method comprises processing the CVS, wherein: the CVS comprises a first set of one or more codewords that encodes a first set of one or more values representing a first part of a segment address, the CVS comprises a second set of one or more codewords that encodes a second set of one or more values representing a second part of the segment address, and the segment address specifies the spatial location of a segment within a picture.

A second aspect of the embodiments defines a method performed by an encoder. The method comprises generating a coded video stream (CVS), wherein: the CVS comprises a first set of one or more codewords that encodes a first set of one or more values representing a first part of a segment address, the CVS comprises a second set of one or more codewords that encodes a second set of one or more values representing a second part of the segment address, and the segment address specifies the spatial location of a segment within a picture.

A third aspect of the embodiments defines a computer program comprising instructions which, when executed by processing circuitry, causes the processing circuitry to perform the method according to the first or the second aspect of the embodiments.

A fourth aspect of the embodiments defines a carrier containing the computer program according to the third aspect, wherein the carrier is one of an electronic signal, an optical signal, a radio signal, and a computer readable storage medium.

A fifth aspect of the embodiments defines a decoding apparatus adapted to perform the method according to the first aspect of the embodiments.

A sixth aspect of the embodiments defines an encoding apparatus adapted to perform the method according to the second aspect of the embodiments.

Advantages

An advantage of the embodiments is that they simplify the multi-step process for deriving the relative position of slices in a subpicture by, in one embodiment, signaling two values in the slice header, one being the slice address relative to the subpicture and the other value providing the information about which subpicture the slice belongs to e.g. the subpicture ID which exploits the fixed relation of the slice to a subpicture and spatial position of the slice in a subpicture area to decoding process and to simplify sub-bitstream extraction and merge. If there are multiple slices in a subpicture, bitstream extraction using the current VVC design may require address indirection for the slice_address values in each slice. Using the proposed embodiment, address indirection is instead done per subpicture, which means that address indirection is only done once for all slices in the subpicture.

DETAILED DESCRIPTION

Figure 1:
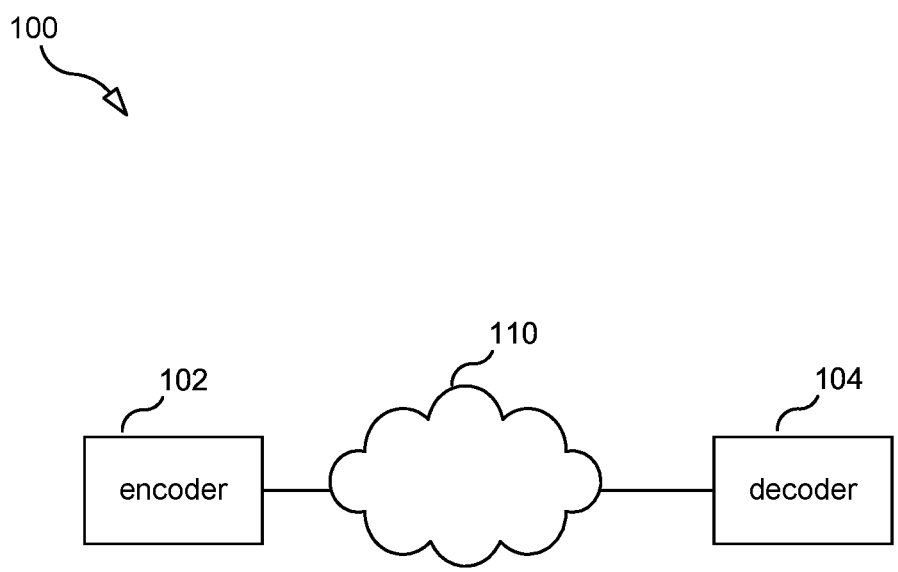
FIG. 1 illustrates a system according to an embodiment.

FIG. 1 illustrates a system 100 according to an example embodiment. System 200 includes an encoder 202 in communication with a decoder 204 via a network 110 (e.g., the Internet or other network). Deblocking may be performed in both encoder 202 and decoder 204. The embodiments described herein can be used in video encoder 102 or video decoder 104.

Figure 2:
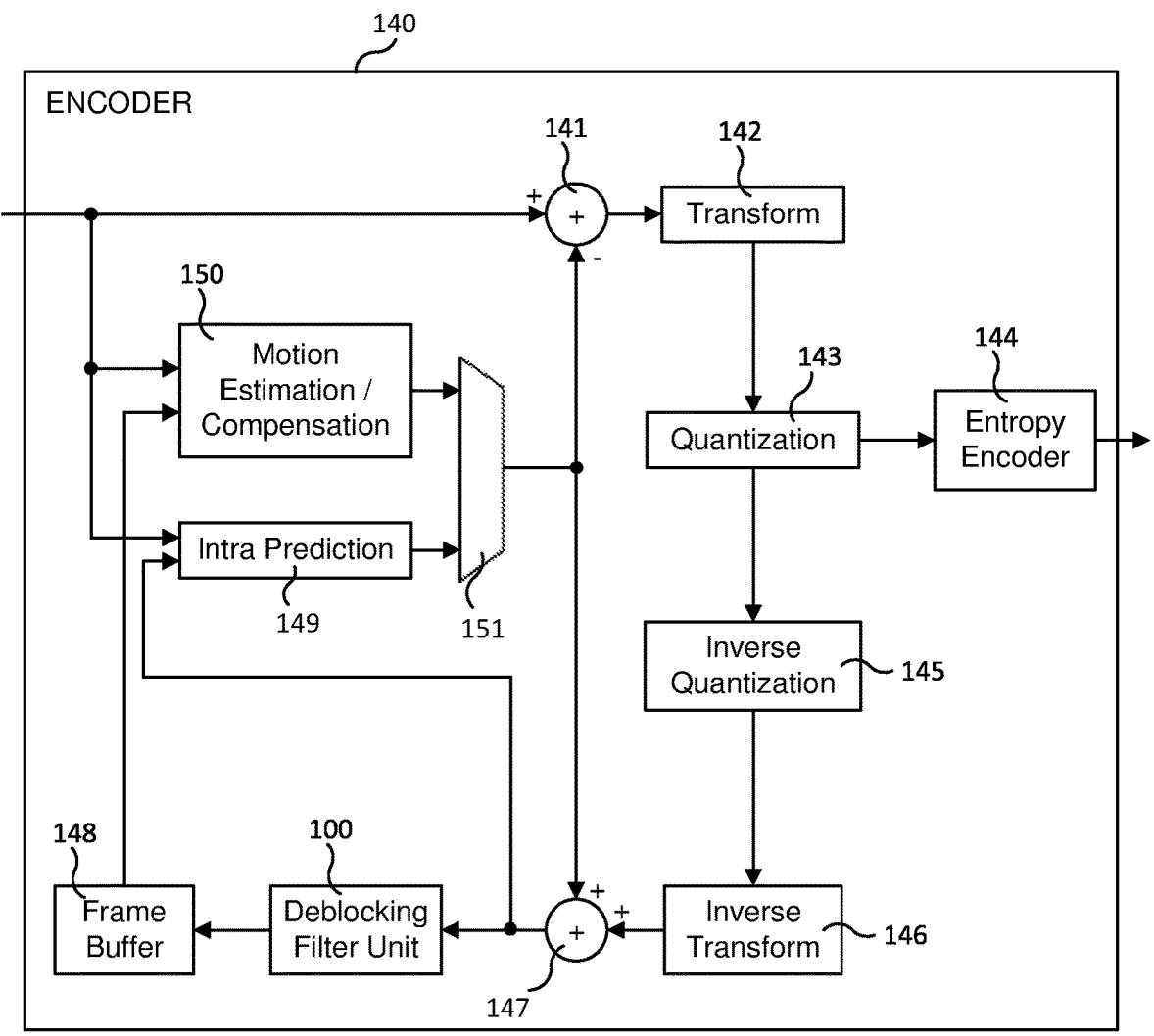
FIG. 2 is a schematic block diagram of a video encoder according to one embodiment.

FIG. 2 is a schematic block diagram of a video encoder 102 according to one embodiment. A current block of pixels is predicted by performing a motion estimation using motion estimator 250 from an already provided block of pixels in the same frame or in a previous frame. The result of the motion estimation is a motion or displacement vector associated with the reference block, in the case of inter prediction. The motion vector may be used by motion compensator 250 to output an inter prediction of the block of pixels. Intra predictor 249 computes an intra prediction of the current block of pixels. The outputs from the motion estimator/compensator 250 and the intra predictor 249 are input in selector 251 that either selects intra prediction or inter prediction for the current block of pixels. The output from the selector 251 is input to an error calculator in the form of adder 241 that also receives the pixel values of the current block of pixels. Adder 241 calculates and outputs a residual error as the difference in pixel values between the block of pixels and its prediction. The error is transformed in transformer 242, such as by a discrete cosine transform, and quantized by quantizer 243 followed by coding in encoder 244, such as by entropy encoder. In inter coding, also the estimated motion vector is brought to encoder 244 to generate the coded representation of the current block of pixels. The transformed and quantized residual error for the current block of pixels is also provided to an inverse quantizer 245 and inverse transformer 246 to retrieve the original residual error. This error is added by adder 247 to the block prediction output from the motion compensator 250 or intra predictor 249 to create a reference block of pixels that can be used in the prediction and coding of a next block of pixels. This new reference block is first processed by a deblocking filter 200. The processed new reference block is then temporarily stored in frame buffer 248, where it is available to intra predictor 249 and motion estimator/compensator 250.

Figure 3:
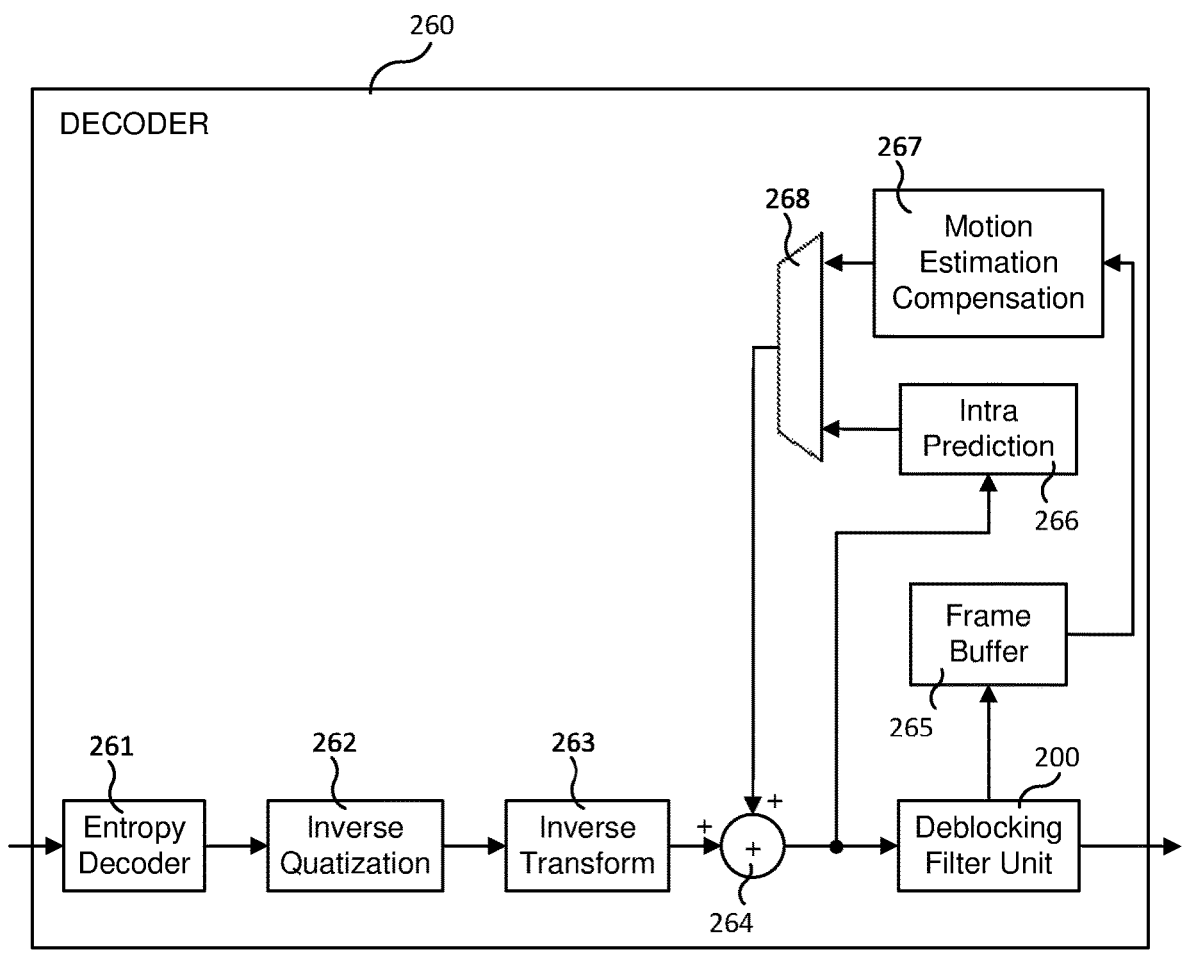
FIG. 3 is a schematic block diagram of a video decoder according to one embodiment.

FIG. 3 is a block diagram of a video decoder 104 according to some embodiments. Decoder 104 includes a decoder 361, such as entropy decoder, to decode an encoded representation of a block of pixels to get a set of quantized and transformed residual errors. These residual errors are dequantized by inverse quantizer 362 and inverse transformed by inverse transformer 363 to provide a set of residual errors. These residual errors are added by ladder 364 to the pixel values of a reference block of pixels. The reference block is determined by a motion estimator/compensator 367 or intra predictor 366, depending on whether inter or intra prediction is performed. Selector 368 is thereby interconnected to adder 364 and motion estimator/compensator 367 and intra predictor 366. The resulting decoded block of pixels output form adder 364 is input to deblocking filter 300. The filtered block of pixels is output from decoder 104 and may be furthermore temporarily provided to frame buffer 365 to be used as a reference block of pixels for a subsequent block of pixels to be decoded. Frame buffer 365 is thereby connected to motion estimator/compensator 367 to make the stored blocks of pixels available to motion estimator/compensator 367. The output from adder 364 also be input to intra predictor 366 to be used as an unfiltered reference block of pixels.

Figure 4:
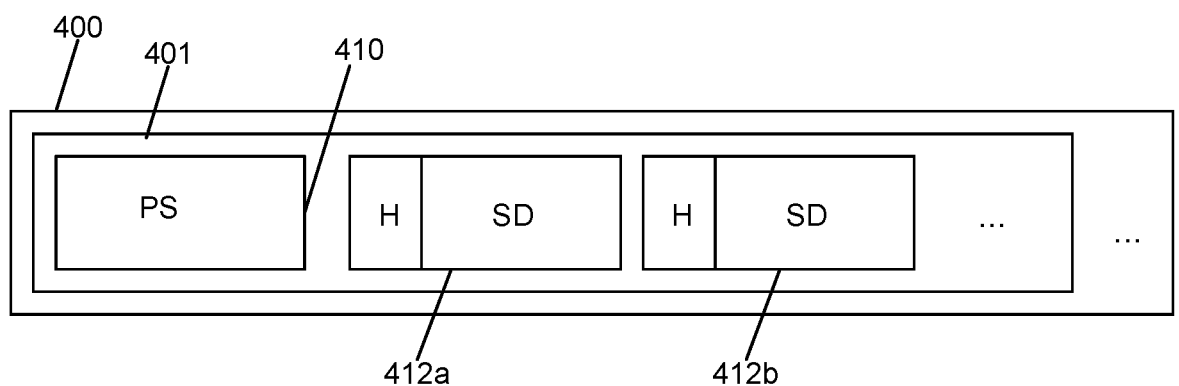
FIG. 4 illustrates an encoded video bitstream according to an embodiment.

FIG. 4 illustrates an example video bitstream 400. The bitstream 400 includes a CVS 401, which comprises a parameter set (PS) 410 (e.g., a non-VCL NAL unit that contains a parameter set) and a number of segments (e.g., a number of VCL NAL units that contain a VVC slice). Segments 412a and 412b are shown. A segment is a unit of data that comprises segment data (SD), which comprises sample data. A segment may have a segment header (SH) in addition to the segment data (SD). A VVC slice and an HEVC slice are examples of a segment. A segment can also be a picture, a tile group or some other entity that comprises a full picture or a part of a picture. In this example, each segment includes a segment header in addition to the segment data.

Figure 5:
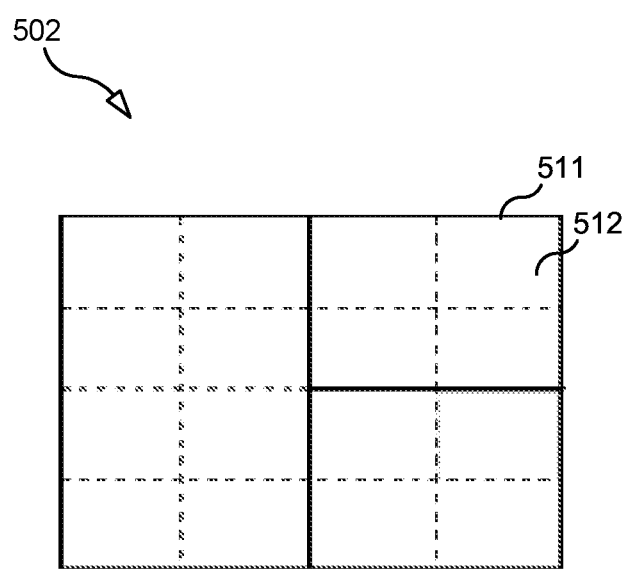
FIG. 5 illustrates hierarchical partitioning.
Figure 6:
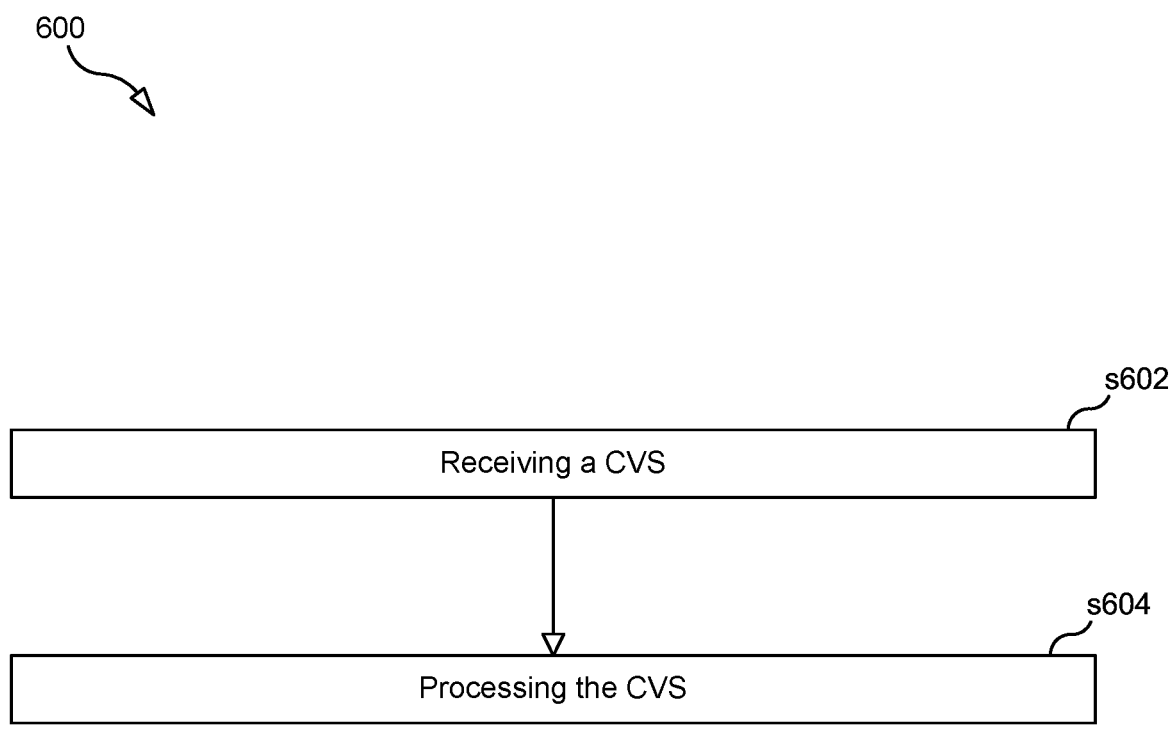
FIG. 6 is a flowchart illustrating a decoding process according to an embodiment.
Figure 7:
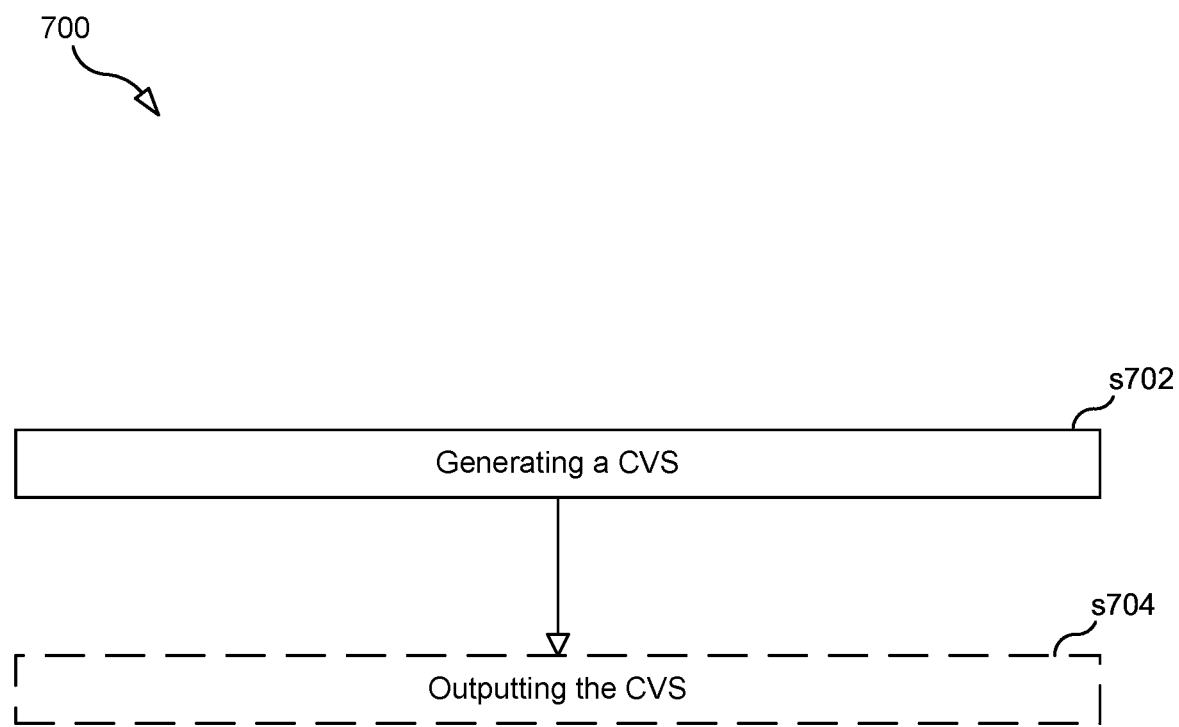
FIG. 7 is a flowchart illustrating an encoding process according to an embodiment.

A case of hierarchical partitioning is illustrated in FIG. 5 where a picture 502 is partitioned into large grain partition blocks (e.g., a VVC subpicture) shown with thick lines (e.g. block 511) and the thin dotted lines show small grain partition blocks (e.g., VVC slices) inside the large grain partition blocks (see e.g., block 512, which is spatially located in block 511). In some embodiments, in case of such a hierarchical partitioning, at least two values are signaled in a header or parameter set of a small grain partition block (e.g., block 512): i) one value specifying which large grain partition block the small grain partition is spatially located in (e.g., block 511) and ii) one value to provide the address of the small grain partition block relative to the position of the large grain partition block. A VVC slice is an example of a small grain partition block and a VVC subpicture is an example of a large grain partition blocks.

It is to be understood by a person skilled in the art that the embodiments below may be combined to form solutions that are not explicitly defined, but still covered by this disclosure. Also, the embodiments described below may be described in terms of slices (e.g., small grain partition blocks) and subpictures (e.g., large grain partition blocks). That is, the terms slice and subpicture are used interchangeably with small grain partition block and large grain partition block, respectively. Also, although the embodiments are described with respect to slices, the invention is not limited to slices and is intended to cover other segments.

1. Two Values Signaled for Slice Address in the Slice Header

In a first embodiment, two values are signaled in a header or parameter set of a slice: i) a first value, e.g. an ID, that indicates the large grain partition block in which the small grain partition block is spatially located and ii) a second value that indicates the positioning of the small grain partition block relative to the position of the large grain partition block. As an example for this embodiment, two values are signaled in the slice header that together form the slice address: i) a first value for the subpicture ID, which indicates the subpicture to which the slice belongs (i.e., the subpicture in which the slice is located) and ii) one value for a local slice address, which indicates the spatial positioning of the slice relative to the subpicture position to which the slice belongs. Following is exemplary syntax and semantics for a slice header (note that all exemplary syntax and semantics are given as text on top of the current version of the VVC draft specification):

TABLE 6

| | Descriptor |
|---|---|
| slice_header( ) { | |
| slice_pic_parameter_set_id | ue(v) |
| if( rect_slice_flag \|\| NumBricksInPic > 1 ) { | |
| if (subpics_present_flag) | |
| subpic_id | u(v) |
| local_slice_address | u(v) |
| } | |
| ... | |
| } | |

The subpic_id codeword (a.k.a., syntax element) specifies the ID of the subpicture to which the slice belongs. The subpic_id codeword is in the table conditioned on sub-pics_present_flag, which is true (equal to 1) when there are subpictures in the picture and false (equal to 0) when there are no subpictures. If subpic_id is false, the local slice address codeword specifies the spatial positioning of the slice relative to the picture rather than the subpicture. Note that other conditions on the presence of subpic_id are possible and that there may be no condition, meaning that subpic_is always present when local slice address is present. When not present, the value of subpic_id is inferred to be equal to 0. The length of the syntax element is Ceil(Log 2(N)) bits. Note that in the current version of VVC 8 bits are used in SPS to signal max_subpics_minus_1 which may be in the range 0 to 254. N could then for example be 254.

The local_slice_address codeword specifies the slice address of the slice in the subpicture identified by subpic_id. When not present, the value of local slice address is inferred to be equal to 0. The length of the syntax element is Ceil(Log 2(max_num_slices_in_picture_minus1+1)) bits, where max_num_slices_in_picture_minus1+1 is the maximum number of slices allowed by the profile, tier, or level definition in use.

An alternative semantics for local_slice_address looks as follows:

The local_slice_address codeword specifies the address of the slice. When not present, the value of local_slice_address is inferred to be equal to 0. If subpictures are not enabled (subpics_present_flag is equal to 0), the following applies: 1) the slice address is the brick ID; 2) the length of slice_address is Ceil(Log 2 (NumBricksInPic)) bits; and 3) the value of slice_address shall be in the range of 0 to NumBricksInPic−1, inclusive. Otherwise, if subpictures are enabled (subpics_present_flag is equal to 1), the following applies: 1) the slice address is the slice address of the slice in the subpicture with subpic_id; and 2) the length of slice_address is equal to signalled_slice_id_length_minus1+1 bits.

A decoder may perform the following steps for this embodiment to decode one or more pictures from a bitstream, where the bitstream comprises at least two slices:

1) Determine from one or more syntax elements in the bitstream whether the partition structure has more than one level of hierarchy.

2) For a slice in the case there is more than one level of hierarchy do the following: 2a) decode a first value from a codeword in a slice header for the slice where the first value represents a first part of an address; 2b) decode a second value from a codeword in the slice header, where the second value represents a second part of an address; 2c) derive a slice address from the first and second value, locating the slice within a picture; and 2d) Use the slice address to decode the slice.

In another version two sets of values are signaled in a header or parameter set of a slice where each set may include one or more values and the one or more values in one of the sets collectively indicate the positioning of the slice relative to the position of a subpicture and the one or more values in another set collectively indicate the slice is spatially located in which subpicture. As an example for this version, two value sets are signaled in the slice header for the slice address, one value set includes one value for a subpicture ID which indicates which subpicture the slice belongs to, and one value set that includes two values $X_s$ and $Y_s$ that collectively indicate the spatial positioning of the slice relative to the subpicture position that the slice belongs to.

2—Using Indirection

In another embodiment, two values are signaled in a header or parameter set of a small grain partition block: i) one value indicates the large grain partition block in which the small grain partition block is spatially located and ii) the other value indicates the positioning of the small grain partition block relative to the position of the large grain partition block, and at least one of the two values use indirection mechanism—e.g. using an index mapping list or an address mapping list which may be signaled in a parameter set in the bitstream—e.g. a PPS or a SPS to specify the targeted values. Preferably, in this embodiment, the large grain partition block is the one using the indirection mechanism.

For example, assume that a picture is split into four spatial quadrants where each quadrant is a subpicture. Assume further that each of the four subpictures consist of only one slice each. In this example, all second values (e.g. the local slice address values) may be equal to 0 to indicate that the position of the slices is equal to the position of the subpicture. The first ID values (e.g. the subpic_id values) may be equal to 0, 1, 2, 3 respectively to indicate the subpictures to which each slice belong. Now, consider that subpictures 2 and 3 are extracted from the bitstream and a new bitstream consisting of those two subpictures are created. To support such an operation, the e.g. PPS may contain an indirection or an index mapping in which ID values 2 and 3 are mapped to 0 and 1 respectively. A decoder decoding the new bitstream may first decode that there are two subpictures in the new bitstream and therefore assign final subpicture ID 0 and 1 to them. Then the decoder will decode information in the PPS to create the index mapping. After that, the decoder may decode a slice with an ID value of 2. Using the index mapping, a final subpicture ID value equal to 0 is derived. Similarly, for slices with ID value of 3, the final subpicture ID value is derived as equal to 1. By this indirection or index mapping mechanism, it is possible to extract subpicture data and form a new bitstream without rewriting the slice ID values in each slice, but instead only create an index mapping once.

3—Signaling Addresses for More Than One Level Partitioning Hierarchy

In another embodiment, more than two level partitioning hierarchy exists—e.g. a three level partitioning hierarchy with small, medium and large grain partition blocks, and at least three values are signaled in a header or parameter set of a small grain partition block: i) a first value—e.g. an ID—that indicates the medium grain partition block in which the small grain partition block is spatially located, ii) a second value that indicates the positioning of the small grain partition block relative to the position of the medium grain partition block, and iii) a third value that indicates the large grain partition block in which the small grain partition block is spatially located. In some embodiments the header also includes a fourth value that indicates the positioning of the small grain partition block relative to the position of the large grain partition block. In this embodiment the spatial location of the medium grain partition block relative to the large grain block partition is derived from the differences of the spatial position of the small grain partition block relative to the medium and large grain partition blocks.

4—Signaling of Number of Local Slices in Subpicture

In another embodiment, which may be based on any of the previous embodiments the number of slices in the current subpicture is known when decoding a slice. This information may be signaled with e.g. a num_slices_in_subpic or num_slices_in_subpic_minus1 codeword, directly in the slice header or in a parameter set for each subpicture. The example below describes syntax and semantics on top of the current version of VVC, for signaling num_slices_in_subpic_minus1 in the slice header:

|  | Descriptor |
|---|---|
| slice_header( ) { |  |
|   slice_pic_parameter_set_id | ue(v) |
|   if( rect_slice_flag \|\| NumBricksInPic > 1 ) { |  |
|     ~~slice_address~~ | ~~u(v)~~ |
|     subpic_id | u(v) |
|     num_slices_in_subpic_minus1 | ue(v) |
|     local_slice_address | u(v) |
|   } |  |
|   ... |  |
| } |  |

The subpic_id codeword specifies the ID of the subpicture that slice belongs to. When not present, the value of subpic_id is inferred to be equal to 0. The length of the syntax element is Ceil(Log 2(N)) bits. Note that in the current version of VVC 8 bits are used in SPS to signal max_subpics_minus_1 which may be in the range 0 to 254. N could then for example be 254.

The num_slices_in_subpic_minus1 codeword indicates the number of slices that are present in the current subpicture (i.e., num_slices_in_subpic_minus1 plus 1). When not present, the value of num_slices_in_subpic_minus1 is inferred to be equal to 0.

The local_slice_address codeword specifies the slice address of the slice in the subpicture with subpic_id. When not present, the value of local_slice_address is inferred to be equal to 0. The length of the syntax element is Ceil(Log 2(num_slices_in_subpic_minus1+1)) bits.

The example below describes syntax and semantics on top of the current version of VVC, for signaling num_slices_in_subpic_minus1[i] for each subpicture in the SPS:

TABLE 8

| | Descriptor |
|---|---|
| seq_parameter_set_rbsp( ) { | |
| ... | |
| subpics_present_flag | u(1) |
| if( subpics_present_flag ) { | |
| max_subpics_minus1 | u(8) |
| ... | |
| for( i = 0; i <= NumSubPics; i++ ) { | |
| subpic_treated_as_pic_flag[ i ] | u(1) |
| loop_filter_across_subpic_enabled_flag[ i ] | u(1) |
| num_slices_in_subpic_minus1[ i ] | u(v) |
| } | |
| } | |
| } | |

The value of max_subpics_minus1 plus 1 specifies the maximum number of subpictures that may be present in the CVS. max_subpics_minus1 shall be in the range of 0 to 254. The value of 255 is reserved for future use by ITU-T|ISO/IEC.

The value of num_slices_in_subpic_minus1[i] plus 1 specifies the number of slices that are present in the i-th subpicture. When not present, the value of num_slices_in_subpic_minus1[i] is inferred to be equal to 0.

Embodiment 5—Using Max_Subpic_Minus1 when Deriving Subpic_Id

In another embodiment, which may be based on the first embodiment, the max_subpics_minus1 codeword signaled in SPS in the current version of VVC is used for deriving the number of bits used for the subpic_id. The semantics for the subpic_id in the slice header could then be: subpic_id specifies the ID of the subpicture to which the slice belongs. When not present, the value of subpic_id is inferred to be equal to 0. The length of the syntax element is Ceil(Log 2(max_subpics_minus1+1)) bits.

6—Signaling One Slice Per Subpicture

In one embodiment a flag single_slice_in_subpicture_flag is present in a parameter set, preferably the SPS or DPS. When this flag has one value, there shall be no subpicture that consist of more than one slice. When this flag has another value, there may be multiple slice in a subpicture.

The presence of the slice_address code word may be conditioned on this flag such that the slice_address code word is not parsed when the flag indicates that there is one slice in each subpicture.

TABLE 9

| | Descriptor |
|---|---|
| seq_parameter_set_rbsp( ) { | |
| ... | |
| subpics_present_flag | u(1) |
| if( subpics_present_flag ) { | |
| max_subpics_minus1 | u(8) |
| single_slice_in_subpicture_flag | u(1) |
| ... | |
| } | |
| } | |

When the value of single_slice_in_subpicture_flag equals 1, this specifies that there is only one slice in each subpicture in the CVS referring to the SPS. When the value of single_tile_in_pic_flag is equal to 0 this specifies that there may be more than one slice in a subpicture in the CVS referring to the SPS. When single_slice_in_subpicture_flag is not present, it is inferred to be equal to 0.

TABLE 10

| | Descriptor |
|---|---|
| pic_parameter_set_rbsp( ) { | |
| ... | |
| if( ~~rect_slice_flag~~ subpics_present_flag ) { | |
| signalled_slice_id_flag | u(1) |
| if( signalled_slice_id_flag ) { | |
| signalled_slice_id_length_minus1 | ue(v) |
| for( i = 0; i <= num_slices_in_pic_minus1; i++ ) | |
| slice_id[ i ] | u(v) |
| } | |
| } | | signalled_slice_id_length_minus1 plus 1 specifies the number of bits used to represent the syntax element slice_id [i] when present, and the syntax element slice_address in slice headers. The value of signalled_slice_id_length_minus1 shall be in the range of 0 to 15, inclusive. When not present, the value of signalled_slice_id_length_minus1 is inferred to be equal to Ceil(Log 2(Max(2, num_slices_in_pic_minus1+1)))−1.

TABLE 11

| | Descriptor |
|---|---|
| slice_header( ) { | |
| slice_pic_parameter_set_id | ue(v) |
| if(subpics_present_flag ) | |
| subpic_id | u(v) |
| ~~if( rect_slice_flag || NumBricksInPic > 1 )~~ | |
| if (!single_slice_in_subpicture_flag \|\| NumBricksInPic > 1 ) | |
| slice_address | u(v) |
| ... | |
| } | | subpic_id specifies the ID of the subpicture to which the slice belongs. When not present, the value of subpic_id is inferred to be equal to 0. The length of the syntax element is Ceil(Log 2(max_subpics_minus1+1)) bits.

slice_address specifies the address of the slice. When not present, the value of slice_address is inferred to be equal to 0.

If subpictures are not enabled (subpics_present_flag is equal to 0), the following applies: 1) the slice address is the brick ID; 2) the length of slice_address is Ceil(Log 2 (NumBricksInPic)) bits; and 3) the value of slice_address shall be in the range of 0 to NumBricksInPic−1, inclusive.

Otherwise, if subpictures are enabled (subpics_present_flag is equal to 1), the following applies: 1) the slice address is the slice address of the slice within the subpicture with subpicture ID equal to subpic_id; and 2) the length of slice_address is signalled_slice_id_length_minus1+1 bits.

Alternatively, the maximum number of slices per subpicture, max_number_of_slices_per_subpic_minus1, codeword may be signaled in a parameter set. In this case, the slice_address codeword is not parsed by the decoder but inferred to be equal to 0 if max_number_of_slices_per_subpic_minus1 is equal to 0. The number of bits to use for slice_address in case max_number_of_slices_per_subpic_minus1 is larger than 0 might be set equal to Ceil (Log 2(max_number_of_slices_per_subpic_minus1+1)) bits.

Figure 8:
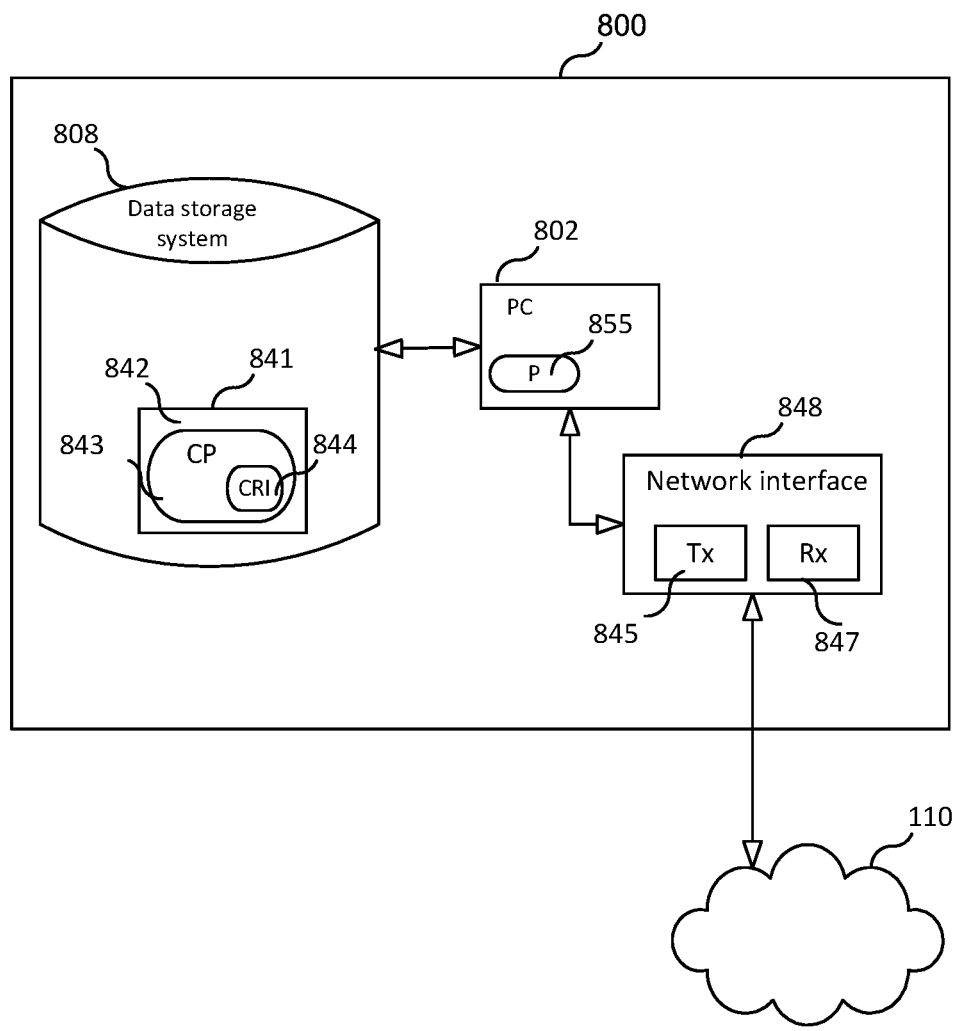
FIG. 8 is a block diagram of an apparatus according to an embodiment.
Figure 9A:
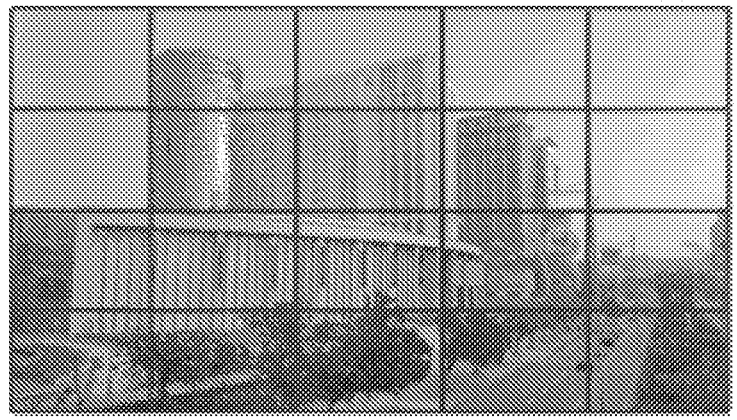
FIG. 9A shows an example of partitioning.
Figure 9B:
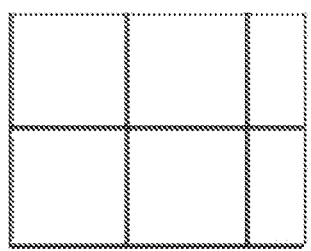
FIG. 9B illustrates two-step tile partitioning.
Figure 9B:
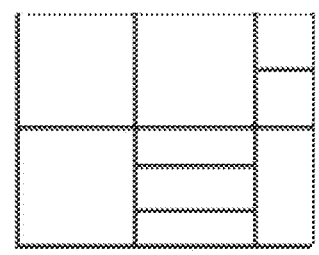

FIG. 8 is a block diagram of an apparatus 800, according to some embodiments, for implementing the video encoder 102 or the video decoder 104. That is, apparatus 800 is operative to perform process 600 and/or process 700. In embodiments where apparatus 800 implements video encoder 102, apparatus 800 may be referred to as "encoding apparatus 800," and in embodiments where apparatus 800 implements video decoder 104, apparatus 800 may be referred to as "decoding apparatus 800." As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); a network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software.

While various embodiments are described herein (including the additional material), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

| Abbreviation | Explanation |
| --- | --- |
| ATSC | Advanced Television Systems Comitee |
| AU | Access Unit |
| AUD | Access Unit Delimiter |
| ALF | Adaptive Loop Filter |
| APS | Adaptive Parameter Set |
| BLA | Broken Link Access |
| CLVS | Coded Layer Video Sequence |
| CRA | Clean Random Access |
| CVS | Coded Video Stream |
| CVSS | CVS Start |
| CU | Coding Unit |
| DASH | Dynamic Adaptive Streaming over HTTP |
| DPS | Decoding Parameter Set |
| DVB | Digital Video Broadcasting |
| DRAP | Dependent Random Access Point |
| GDR | Gradual Decoding Refresh |
| HEVC | High-Efficiency Video Coding |
| IDR | Instantaneous Decoding Refresh |
| IRAP | Intra Random Access Point |
| ISO | International Standardization Organization |
| ISOBMFF | ISO Base Media File Format |
| FMCS | Luma Mapping and Chroma Scaling |
| MPEG | Motion Picture Experts Group |
| MMT | MPEG Media Transport |
| NAE | Network Abstraction Layer |
| NALU | NAL unit |
| NUT | NAL unit type |
| PPS | Picture Parameter Set |
| RADL | Random Access Decodable Leading |
| RAP | Random Access Point |
| RASL | Random Access Skipped Leading |
| RBSP | Raw Byte Sequence Payload |
| RPL | Reference Picture List |
| SEI | Supplemental Enhancement layer |
| SPS | Sequence Parameter Set |
| STSA | Step-wise Temporal Layer Access |
| VCL | Video Coding Layer |
| VPS | Video Parameter Set |
| VVC | Versatile Video Coding |

Additional Material

The following text is from a contribution that proposes changes to the current version of VVC.
Begin Text
Abstract This contribution proposes the following changes to the VVC specification related to the slice address signaling in case of subpictures:

Firstly, it is proposed to signal a subpicture ID in the slice header to specify which subpicture the current slice belongs to, conditioned on the presence of subpictures in the CVS.

Secondly, it is proposed to signal the slice address in the slice header relative to the subpicture position.

Thirdly it is proposed to use address indirection for subpicture ID and remove address indirection for slice addresses. For each subpicture the slice addresses are fixed relative to the subpicture and can be reused during sub-bitstream extraction and merge processes.

1. Introduction

In the current VVC specification draft in JVET-O2001-vE, subpictures are supported and targets simplifying the sub-bitstream extraction and merge processes. However, the address signaling mechanisms for subpictures with regards to other defined hierarchical partitions such as picture and slices might require improvements.

In the current VVC specification draft, slice addresses are signaled in the slice header and are used to derive the spatial position of the slice in the picture. However, there are a few issues with the current slice address signaling scheme when subpictures are used and when there is more than one slice in the subpictures:

1—The spatial position of the slice in the subpicture cannot be derived directly from the slice_address syntax in the slice header and it requires a multi-steps process:
  the spatial position of the slice in the picture needs to be derived first
  then in a second step it needs to be derived which subpicture that spatial position in the picture belongs to
  then in a third step the spatial position of the slice in that subpicture can be derived.
2—From the slice header it cannot be derived which subpicture this slice belongs to. This information would be useful for the sub-bitstream merge and extraction process.
3—The fixed relative spatial position of slices in subpicture is not exploited when subpictures are being extracted or merged (as in sub-bitstream extraction and merge).
4—The indirection mechanism used for mapping the slice_address to slice_id might be suboptimal for sub-bitstream extraction and merge processes since in case of multiple slices in a subpicture, sub-bitstream extraction using the current VVC design may require several address indirections: one indirection for slice address values in each slice.

2. Proposal

This contribution proposes a solution to solve the above issues and to simplify multi-step process for deriving the relative position of slices in a subpicture. This contribution proposes following changes related to the slice address signaling in case of subpictures:

Firstly, it is proposed to signal a subpicture ID in the slice header to specify which subpicture the current slice belongs to, conditioned to the presence of subpictures in the CVS.

Secondly, it is proposed to signal the slice address in the slice header relative to the subpicture position.

Thirdly it is proposed to use address indirection for subpicture ID and remove address indirection for slice addresses. For each subpicture the slice addresses are fixed relative to the subpicture and can be reused during sub-bitstream extraction and merge processes.

With this proposal, the four previously mentioned issues are solved in the following way:

1. The spatial position of the slice in the subpicture is derived directly from the slice header.
2. The ID of the subpicture that the slice belongs to is signaled in the slice header.
3. The relative spatial position of slices in a subpicture is signaled in the slice header
4. The indirection process is done per subpicture (instead of per slice) in the extraction and merge of the subpictures.

Below are the proposed syntax and semantics changes in the slice header on top of JVET-O2001-vE:

|  | Descriptor |
|---|---|
| seq_parameter_set_rbsp( ) { | |
| ... | |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
|   signalled_subpic_id_flag | u(1) |
|   if( signalled_subpic_id_flag ) { | |
|     signalled_subpic_id_length_minus1 | ue(v) |
|     for( i = 0; i < NumSubPics; i++ ) | |
|       subpic_id[ i ] | U(v) |
|   } | |
| } | |
| ... | |
| } | | max_subpics_minus1 plus 1 specifies the maximum number of subpictures that may be present in the CVS. max_subpics_minus1 shall be in the range of 0 to 254. The value of 255 is reserved for future use by ITU-T|ISO/IEC.

subpic_grid_col_width_minus1 plus 1 specifies the width of each element of the subpicture identifier grid in units of 4 samples. The length of the syntax element is Ceil(Log 2(pic_width_max_in_luma_samples/4)) bits. The variable NumSubPicGridCols is derived as follows:

$$NumSubPicGridCols = (pic\_width\_max\_in\_luma\_samples + subpic\_grid\_col\_width\_minus1 * 4 + 3) / (subpic\_grid\_col\_width\_minus1 * 4 + 4) \quad (7\text{-}5)$$

subpic_grid_row_height_minus1 plus 1 specifies the height of each element of the subpicture identifier grid in units of 4 samples. The length of the syntax element is Ceil(Log 2(pic_height_max_in_luma_samples/4)) bits. The variable NumSubPicGridRows is derived as follows:

$$NumSubPicGridRows = (pic\_height\_max\_in\_luma\_samples + subpic\_grid\_row\_height\_minus1 * 4 + 3) / (subpic\_grid\_row\_height\_minus1 * 4 + 4) \quad (7\text{-}6)$$

subpic_grid_idx[i][j] specifies the subpicture index of the grid position (i, j). The length of the syntax element is Ceil(Log 2(max_subpics_minus1+1)) bits.

The variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]], and NumSubPics are derived as follows:

```
NumSubPics = 0
for( i = 0; i. < NumSubPicGridRows; i++ ) {
  for( j = 0; j < NumSubPicGridCols; j++ ) {
    if ( i = = 0)
      SubPicTop[ subpic_grid_idx[ i ][ j ] ] = 0
    else if( subpic_grid_idx[ i ] [ j ] != subpic_grid_idx[ i - 1 ] [ j ]) {
      SubPicTop[ subpic_grid_idx[ i ][ j ] ] = i
      SubPicHeight[ subpic_grid_idx[ i - 1 ][ j ] ] = i - SubPicTop[ subpic_grid_idx[ i - 1 ][ j ] ]
    }
    if ( j = = 0)
      SubPicLeft[ subpic_grid_idx[ i ][ j ] ] = 0                    (7-7)
    else if (subpic_grid_idx[ i ][ j ] != subpic_grid_idx[ i ][ j - 1 ] ) {
      SubPicLeft[ subpic_grid_idx[ i ][ j ] ] =j
      SubPicWidth[ subpic_grid_idx[ i ][ j ] ] = j - SubPicLeft[ subpic_grid_idx[ i ][ j - 1 ] ]
    }
    if ( i = = - 1)
      SubPicHeight[ subpic_grid_idx[ i ][ j ] ] =
i - SubPicTop[ subpic_grid_idx[ i - 1 ][ j ] ] + 1
    if (j = = NumSubPicGridRows - 1)
      SubPicWidth[ subpic_grid_idx[ i ][ j ] ] = j - SubPicLeft[ subpic_grid_idx[ i ][ j - 1 ] ] + 1
    if( subpic_grid_idx[ i ] [ j ] > NumSubPics)
      NumSubPics = subpic_grid_idx[ i ][ j ]
  }
}
``` subpic_treated_as_pic_flag[i] equal to 1 specifies that the i-th subpicture of each coded picture in the CVS is treated as a picture in the decoding process excluding in-loop filtering operations. subpic_treated_as_pic_flag[i] equal to 0 specifies that the i-th subpicture of each coded picture in the CVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CVS. loop_filter_across_subpic_enabled_flag [i] equal to 0 specifies that in-loop filtering operations are not performed across the boundaries of the i-th subpicture in each coded picture in the CVS. When not present, the value of loop_filter_across_subpic_enabled_pic_flag[i] is inferred to be equal to 1.

It is a requirement of bitstream conformance that the following constraints apply:
  For any two subpictures subpicA and subpicB, when the index of subpicA is less than the index of subpicB, any coded NAL unit of subPicA shall succeed any coded NAL unit of subPicB in decoding order.
  The shapes of the subpictures shall be such that each subpicture, when decoded, shall have its entire left boundary and entire top boundary consisting of picture boundaries or consisting of boundaries of previously decoded subpictures.

signalled_subpic_id_flag equal to 1 specifies that the subpicture ID for each subpicture is signalled. signalled_subpic_id_flag equal to 0 specifies that subpic IDs are not signalled. When subpics_present_flag is equal to 0, the value of signalled_subpic_id_flag is inferred to be equal to 0.

signalled_subpic_id_length_minus1 plus 1 specifies the number of bits used to represent the syntax element subpic_id[i] when present, and the syntax element slice_subpic_id in slice headers. The value of signalled_subpic_id_length_minus1 shall be in the range of 0 to 15, inclusive. When not present, the value of signalled_subpic_id_length_minus1 is inferred to be equal to Ceil(Log 2(Max(2, max_subpics_minus1+1)))−1.

subpic_id[i] specifies the subpicture ID of the i-th subpicture. The length of the subpic_id[i] syntax element is signalled_subpic_id_length_minus1+1 bits. When not present, the value of subpic_id[i] is inferred to be equal to i, for each i in the range of 0 to NumSubPics minus 1, inclusive.

Below are the proposed syntax and semantics changes in the slice header on top of JVET-O2001-vE:

|  | Descriptor |
|---|---|
| slice_header( ) { |  |
|   slice_pic_parameter_set_id | ue(v) |
|   if( rect_slice_flag \|\| NumBricksInPic > 1 ){ |  |
|     if( subpics_present_flag ) |  |
|       slice_subpic_id | u(v) |
|     slice_address | u(v) |
|   } |  |
|   ... |  |
| } |  | slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to slice_pic_parameter_set_id.

slice_subpic_id specifies the value of subpic_id for the sub-picture the slice is spatially located in. When not present, the value of slice_subpic_id is inferred to be equal to 0. The length of the syntax element is Ceil(Log 2(max_subpics_minus1)) bits.

slice_address specifies the slice address of the slice. When not present, the value of slice_address is inferred to be equal to 0. If subpics_present_flag is equal to 0, slice_address represents the slice address of the slice relative to the picture, else, if subpics_present_flag is equal to 1, slice_adress represents the slice address of the slice relative to the sub-picture with sub-picture ID equal to slice_subpic_id.

If rect_slice_flag is equal to 0, the following applies:
  The slice address is the brick ID as specified by Equation (7-59).
  The length of slice_address is Ceil(Log 2 (NumBricksInPic)) bits.

The value of slice_address shall be in the range of 0 to NumBricksInPic−1, inclusive.

Otherwise (rect_slice_flag is equal to 1), the following applies:

The length of slice_address is Ceil(Log 2 (NumBricksInPic−NumSubpics)) bits.

It is a requirement of bitstream conformance that the following constraints apply:

When rect_slice_flag is equal to 0, the slices of a picture shall be in increasing order of their slice_address values.

The shapes of the slices of a picture shall be such that each brick, when decoded, shall have its entire left boundary and entire top boundary consisting of a picture boundary or consisting of boundaries of previously decoded brick(s).

num_bricks_in_slice_minus1, when present, specifies the number of bricks in the slice minus 1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
  subpicIdx = 0
  while( slice_subpic_id != subpic_id[ subpicIdx ] )
    subpicIdx++
  sliceIdx = subpic_id[ subpicIdx ] + slice_address
  NumBricksInCurrSlice = NumBricksInSlice[ sliceIdx ]
  brickIdx = TopLeftBrickIdx[ sliceIdx ]
  for( bIdx = 0; brickIdx <= BottomRightBrickIdx[ sliceIdx ];    (7-92)
  brickIdx++ )
    if( BricksToSliceMap[ brickIdx ] = = sliceIdx )
      SliceBrickIdx[ bIdx++ ] = brickIdx
} else {
  NumBricksInCurrSlice = num_bricks_in_slice_minus1 + 1
  SliceBrickIdx[ 0 ] = slice_address
  for( i = 1; i < NumBricksInCurrSlice; i++ )
    SliceBrickIdx[ i ] = SliceBrickIdx[ i − 1 ] + 1
}
```

The invention claimed is:

1. A method performed by a decoder, the method comprising:
receiving a coded video stream (CVS); and
processing the CVS, wherein:
the CVS comprises a slice header comprising a first codeword that encodes a first value representing a first part of a slice address for a slice that belongs to a subpicture, wherein the first value is a subpicture ID which indicates the subpicture to which the slice belongs,
the slice header comprises a second codeword that encodes a second value representing a second part of the slice address, wherein the second value is a local slice address which indicates the spatial positioning of the slice relative to the subpicture position that the slice belongs to, and
the slice address specifies the spatial location of a slice within a picture, wherein
processing the CVS comprises, prior to decoding the second value from the second codeword, deriving a length of the second codeword using a value N derived from a third codeword in the CVS.

2. The method of claim 1, wherein processing the CVS further comprises:
decoding the first value from the first codeword; and
decoding the second value from the second codeword, and
the method further comprises:
deriving the slice address using the first value and the second value; and
using the slice address to decode the slice.

3. The method of claim 2, wherein
N indicates the number of slices that are present in the subpicture.

4. The method of claim 2, wherein deriving the slice address from the first value and the second value comprises:
deriving a mapping list from syntax elements in a parameter set;
using the mapping list to map a certain value to a mapped value that is different than the certain value, wherein the certain value is included in one of the first value or the second value; and
using the mapped value to derive the slice address.

5. The method of claim 1, wherein the method further comprises:
decoding a third value from a third codeword, the third value representing a third part of the address and the third part of the address represents an address in a second hierarchy level that is lower than a first hierarchy level; and
using the first value, the second value, and the third value to derive the segment address.

6. The method of claim 5, wherein the method further comprises:
decoding a fourth value from a fourth codeword, the fourth value representing a fourth part of the address and the fourth part of the address represents an address in a third hierarchy level, and the first hierarchy level is higher than the second hierarchy level, and the second hierarchy level is higher than the third hierarchy level; and
using the first value, the second value, the third value, and the fourth value to derive the segment address.

7. The method of claim 1, further comprising decoding a flag value from a flag in a parameter set to which the CVS refers, wherein
if the flag value is equal to a first value, then there is only one slice in each subpicture in the CVS, and
if the flag value is equal to a second value, then there may be more than one slice in a subpicture in the CVS.

8. The method of claim 1, wherein
the first codeword is included in a slice header for the slice, and
the second codeword is included in the slice header for the slice.

9. The method of claim 1, wherein
the first part of the address represents an address in a first hierarchy level,
the second part of the address represents an address in a second hierarchy level, and
the first hierarchy level is higher than the second hierarchy level.

10. The method of claim 9, wherein the first hierarchy level is subpictures within the picture.

11. The method of claim 10, wherein the second hierarchy level is slices within the first hierarchy level.

12. The method of claim 9, wherein the first hierarchy level is subpictures within the picture, the second hierarchy level is rectangular slices within the subpictures and the first part of an address represents the spatial location of a subpicture within a picture and the second part of an address represents the spatial location of a rectangular slice within a subpicture.

13. The method of claim 1, wherein
the CVS further comprises a codeword that encodes a number N, and
the number N represents a number of partitions of a second hierarchy level in the picture.

14. The method of claim 1, wherein
the CVS further comprises a codeword that encodes a number M, and
the number M represents a number of maximum partitions of a second hierarchy level in the picture.

15. A method performed by an encoder, the method comprising:
generating a coded video stream (CVS), wherein
the CVS comprises a slice header comprising a first codeword that encodes a first value representing a first part of a slice address, wherein the first value is a subpicture ID which indicates the subpicture that the slice belongs to,
the slice header comprises a second codeword that encodes a second value representing a second part of the slice address, wherein the second value is a local slice address which indicates the spatial positioning of the slice relative to the subpicture position that the slice belongs to,
the slice address specifies the spatial location of a slice within a picture, and
the CVS further comprises a third codeword that encodes a third value representing a third part of the address and the third part of the address represents an address in a second hierarchy level that is lower than a first hierarchy level.

16. The method of claim 15, further comprising outputting the CVS.

17. A non-transitory computer readable storage medium storing a computer program comprising instructions which when executed by processing circuitry causes the processing circuitry to perform the method of claim 1.

18. A non-transitory computer readable storage medium storing a computer program comprising instructions which when executed by processing circuitry causes the processing circuitry to perform the method of claim 15.

19. A decoding apparatus, comprising:
memory; and
processing circuitry coupled to the memory, wherein the decoding apparatus is configured to:
obtain a coded video stream (CVS); and
process the obtained CVS, wherein:
the CVS comprises a slice header comprising a first codeword that encodes a first value representing a first part of a slice address, wherein the first value is a subpicture ID which indicates the subpicture that the slice belongs to,
the slice header comprises a second codeword that encodes a second value representing a second part of the slice address, wherein the second value is a local slice address which indicates the spatial positioning of the slice relative to the subpicture position that the slice belongs to, and
the slice address specifies the spatial location of a slice within a picture, wherein
processing the CVS comprises, prior to decoding the second value from the second codeword, deriving a length of the second codeword using a value N derived from a third codeword in the CVS.

20. An encoding apparatus, comprising:
memory; and
processing circuitry coupled to the memory, wherein the encoding apparatus is configured to generating a coded video stream (CVS), wherein
the CVS comprises a slice header comprising a first codeword that encodes a first value representing a first part of a slice address, wherein the first value is a subpicture ID which indicates the subpicture that the slice belongs to,
the slice header comprises a second codeword that encodes a second value representing a second part of the slice address, wherein the second value is a local slice address which indicates the spatial positioning of the slice relative to the subpicture position that the slice belongs to,
the slice address specifies the spatial location of a slice within a picture, and
the CVS further comprises a third codeword that encodes a third value representing a third part of the address and the third part of the address represents an address in a second hierarchy level that is lower than a first hierarchy level.

* * * * *

UNITED STATES PATENT AND TRADEMARK OFFICE
CERTIFICATE OF CORRECTION

PATENT NO. : 12,225,210 B2
APPLICATION NO. : 17/762295
DATED : February 11, 2025
INVENTOR(S) : Damghanian et al.

It is certified that error appears in the above-identified patent and that said Letters Patent is hereby corrected as shown below:

In the Specification

In Column 1, Line 41, delete "JVET-O02001-vE." and insert -- JVET-O2001-vE. --, therefor.

In Column 3, Line 61, delete "RAP" and insert -- IRAP --, therefor.

In Column 4, Line 3, delete "TRAP" and insert -- IRAP --, therefor.

In Column 13, Line 23, delete "ladder" and insert -- adder --, therefor.

In Column 13, Line 37, delete "also" and insert -- may also --, therefor.

In Column 14, Lines 52-53, delete "local slice address" and insert -- local_slice_address --, therefor.

In Column 14, Line 57, delete "local slice address" and insert -- local_slice_address --, therefor.

In Column 14, Lines 59-60, delete "Ceil(Log 2(N))" and insert -- Ceil(Log2(N)) --, therefor.

In Column 14, Line 65, delete "local slice address" and insert -- local_slice_address --, therefor.

In Column 14, Lines 66-67, delete "Ceil(Log 2(max_num_slices_in_picture_minus1+1))" and insert -- Ceil(Log2(max_num_slices_in_picture_minus1+1)) --, therefor.

In Column 15, Line 11, delete "Ceil(Log 2" and insert -- Ceil(Log2 --, therefor.

In Column 16, Line 52, above table, insert header -- TABLE 7 --, therefor.

In Column 17, Line 1, delete "Ceil(Log 2(N))" and insert -- Ceil(Log2(N)) --, therefor.

Signed and Sealed this
Twenty-first Day of October, 2025

John A. Squires
*Director of the United States Patent and Trademark Office*

CERTIFICATE OF CORRECTION (continued)
U.S. Pat. No. 12,225,210 B2

In Column 17, Lines 14-15, delete "Ceil(Log 2(num_slices_in_subpic_minus1+1))" and insert -- Ceil(Log2(num_slices_in_subpic_minus1+1)) --, therefor.

In Column 17, Lines 55-56, delete "Ceil(Log 2(max_subpics_minus1+1))" and insert -- Ceil(Log2(max_subpics_minus1+1)) --, therefor.

In Column 18, Lines 40-41, delete "Ceil(Log 2(Max(2, num_slices_in_pic_minus1+1)))–1." and insert -- Ceil(Log2(Max(2, num_slices_in_pic_minus1+1)))–1. --, therefor.

In Column 18, Line 59, delete "Ceil(Log 2(max_subpics_minus1+1))" and insert -- Ceil(Log2(max_subpics_minus1+1)) --, therefor.

In Column 18, Lines 65-66, delete "Ceil(Log 2 (NumBricksInPic))" and insert -- Ceil(Log2(NumBricksInPic)) --, therefor.

In Column 19, Lines 13-14, delete "Ceil(Log 2(max_number_of_slices_per_subpic_minus1+1))" and insert -- Ceil(Log2(max_number_of_slices_per_subpic_minus1+1)) --, therefor.

In Column 20, Line 30, delete "FMCS" and insert -- LMCS --, therefor.

In Column 20, Line 33, delete "NAE" and insert -- NAL --, therefor.

In Column 22, Lines 41-42, delete "Ceil(Log 2(pic_width_max_in_luma_samples/4))" and insert -- Ceil(Log2(pic_width_max_in_luma_samples/4)) --, therefor.

In Column 22, Line 50, delete "Ceil(Log 2(pic_height_max_in_luma_samples/4))" and insert -- Ceil(Log2(pic_height_max_in_luma_samples/4)) --, therefor.

In Column 22, Line 62, delete "Ceil(Log 2(max_subpics_minus1+1))" and insert -- Ceil(Log2(max_subpics_minus1+1)) --, therefor.

In Columns 23-24, in Table, Line 16, delete "if (i = = – 1)" and insert -- if (i = = NumSubPicGridRows – 1) --, therefor.

In Column 23, Lines 64-65, delete "Ceil(Log 2(Max(2, max_subpics_minus1+1)))–1." and insert -- Ceil(Log2(Max(2, max_subpics_minus1+1)))–1. --, therefor.

In Column 24, Lines 53-54, delete "Ceil(Log 2(max_subpics_minus1))" and insert -- Ceil(Log2(max_subpics_minus1)) --, therefor.

In Column 24, Lines 66-67, delete "Ceil(Log 2 (NumBricksInPic))" and insert -- Ceil(Log2(NumBricksInPic)) --, therefor.

In Column 25, Line 5, delete "Ceil(Log 2" and insert -- Ceil(Log2 --, therefor.